United States Patent
Miyakoshi et al.

[11] Patent Number: 6,111,221
[45] Date of Patent: Aug. 29, 2000

[54] HEAT FIXING ROLLS

[75] Inventors: Masanobu Miyakoshi; Shigeki Shudo; Nobumasa Tomizawa; Takashi Kondou, all of Gunma-ken, Japan

[73] Assignee: Shin-Etsu Chemical Co., Ltd., Tokyo, Japan

[21] Appl. No.: 09/084,285

[22] Filed: May 26, 1998

[30] Foreign Application Priority Data

May 26, 1997 [JP] Japan ..................................... 9-151610

[51] Int. Cl.$^7$ .............................. H05B 1/00; B32B 3/00; C08F 283/00
[52] U.S. Cl. ........................... 219/216; 428/195; 525/478
[58] Field of Search .................................. 219/216, 201; 399/329; 355/289, 290, 295; 525/478; 428/195

[56] References Cited

U.S. PATENT DOCUMENTS

| | | | |
|---|---|---|---|
| 5,118,754 | 6/1992 | Miyakoshi et al. | 524/731 |
| 5,255,060 | 10/1993 | Chikano | 355/290 |
| 5,315,356 | 5/1994 | Nagato et al. | 355/289 |
| 5,519,096 | 5/1996 | Hara | 525/478 |
| 5,530,536 | 6/1996 | Henry et al. | 355/295 |
| 5,614,999 | 3/1997 | Kanesawa et al. | 399/329 |
| 5,645,941 | 7/1997 | Meguriya et al. | 428/447 |
| 5,666,624 | 9/1997 | Kanesawa et al. | 399/329 |

FOREIGN PATENT DOCUMENTS

| | | |
|---|---|---|
| 5-323815A | 12/1993 | Japan . |
| 9-077980A | 3/1997 | Japan . |
| 9-138606A | 5/1997 | Japan . |

*Primary Examiner*—Teresa Walberg
*Assistant Examiner*—Daniel Robinson
*Attorney, Agent, or Firm*—Birch, Stewart, Kolasch & Birch, LLP

[57] ABSTRACT

A heat fixing roll includes a silicone rubber layer on a cylindrical metal mandrel having a penetration of at least 10 according to ASTM D1403 and a fluoroplastic layer thereon. The silicone rubber layer is obtained by molding and curing an addition reaction type liquid silicone rubber composition to the mandrel. The roll provides a sufficient nip width under low pressure, improved abrasion resistance, long-lasting toner release, and a satisfactory fixing function even at a high speed over a long period of time.

16 Claims, 1 Drawing Sheet

HEAT FIXING ROLLS

BACKGROUND OF THE INVENTION

1. Field of the Invention

This invention relates to heat fixing rolls useful as transfer rolls, heating rolls and pressure rolls in plain paper copiers (PPC), laser beam printers (LBP), and facsimile machines.

2. Prior Art

Through the years, facsimile machines, copiers, and computer systems have increased in speed. For increasing the time taken for fixation in a fixing section, attempts have been made to reduce the hardness of rubber material to insure a fixing width or nip width in the high-speed systems of today. Fixing rolls are required to insure a sufficient contact area (also known as nip width) under low pressure and at high speeds in order to have a satisfactory fixing function. Also fixing rolls should be fully durable.

Conventional fixing rolls satisfying these requirements include multi-layer rolls comprising a roll base having a primer coated thereon, a lower layer of sponge obtained by curing a millable silicone rubber with an organic peroxide catalyst, and a surface layer obtained by coating an addition reaction type liquid silicone rubber or condensation reaction type liquid silicone rubber. Rolls formed solely of addition reaction type liquid silicone rubber are also used.

However, the multi-layer sponge rolls have the drawback that due to uneven cell distribution in the sponge, non-uniform pressure is applied to cause variations in the fixed images. The multi-layer sponge rolls having a surface layer of an addition or condensation reaction type liquid silicone rubber coated thereon and the rolls formed solely of addition reaction type liquid silicone rubber are unsatisfactory in abrasion resistance to paper and durability of toner release. Additionally, a system of feeding silicone oil to a silicone roll fails to secure a constant nip width due to swelling of the silicone roll with the silicone oil.

SUMMARY OF THE INVENTION

An object of the invention is to provide a heat fixing roll having a low hardness silicone rubber layer, which insures a sufficient nip width under low pressure, is free of swelling with silicone oil, has improved abrasion resistance and long-lasting toner release, and can produce clear images on copy paper.

We have found that by selecting an addition reaction type liquid silicone rubber composition which will cure into silicone rubber having a penetration of at least 10 according to ASTM D1403, curing the composition to the outer surface of a cylindrical metal mandrel to form a silicone rubber layer thereon, and covering the outer surface of the silicone rubber layer with a fluorocarbon resin, there is obtained a heat fixing roll which insures a sufficient nip width under low pressure, has improved abrasion resistance and long-lasting toner release, and can produce clear images on copy paper moving at a high speed.

Accordingly, the present invention provides a heat fixing roll comprising a cylindrical metal mandrel, a concentric silicone rubber layer having a penetration of at least 10 according to ASTM D1403, and a fluoroplastic layer on the outer surface of the silicone rubber layer. The silicone rubber layer is obtained by curing an addition reaction type liquid silicone rubber composition to the outer surface of the mandrel.

DETAILED DESCRIPTION OF THE INVENTION

Figure 1:
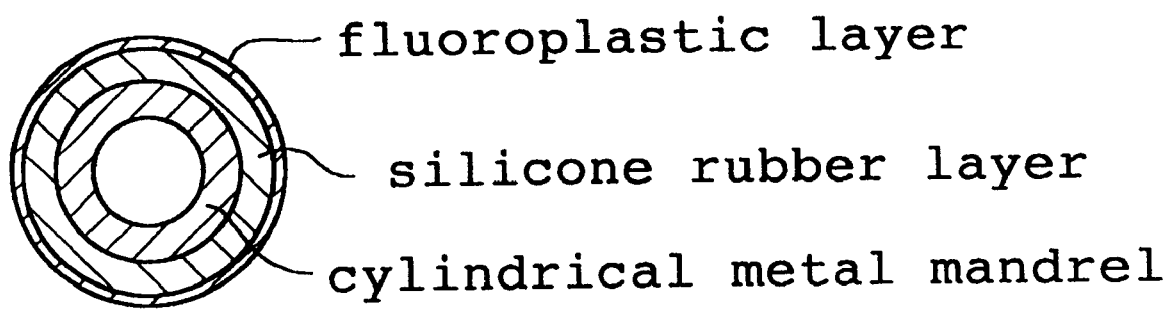
FIG. 1 is a cross sectional view of the heat fixing roll of the present invention.

The heat fixing roll of the invention has a cylindrical metal mandrel which may be formed of any desired metal material such as iron, aluminum or stainless steel. It may be surface treated with a primer.

According to the invention, an addition reaction type liquid silicone rubber composition is applied and cured to the outer surface of the mandrel to form a concentric cured product or silicone rubber layer on the mandrel.

The addition reaction type liquid silicone rubber composition used herein cures into a rubbery elastomer through addition reaction of a polyorganosiloxane having lower alkenyl group such as vinyl groups with a polyorganohydrogensiloxane having hydrogen atoms each attached to a silicon atom (or SiH groups). This addition reaction is promoted by a platinum catalyst. The composition may further contain other additives such as inorganic fillers, pigments and heat-resistance modifiers. Addition reaction type liquid silicone rubber compositions of known formulation may be used. It is essential that the addition reaction type liquid silicone rubber composition cure into a product or silicone rubber having a penetration of at least 10 according to ASTM D1403 (¼ cone). Preferably, the silicone rubber has a penetration of 10 to 200, and especially 15 to 100. This penetration range means that the silicone rubber has such a low hardness (or is soft enough) that when the silicone rubber is measured for hardness by means of a rubber hardness meter according to JIS K6301, the measurement or rubber hardness value is 0, that is, the rubber does give no effective measurement. If the penetration is less than 10, a sufficient nip width to prevent variations and other defects from being introduced in fixed images is not available upon low pressure contact. If the penetration is in excess of 200, it would become difficult to retain a roll shape and paper sheets would slip on the fixing roll.

In one preferred embodiment, the addition reaction type liquid silicone rubber composition which cures into a silicone rubber having a penetration of at least 10, especially at least 15 is a liquid silicone rubber composition comprising (A) an organopolysiloxane having at least two lower alkenyl groups in a molecule, (B) an organopolysiloxane having at least two hydrogen atoms each attached to a silicon atom in a molecule, and (C) a platinum catalyst. Component (B) is contained in such an amount that the molar ratio of the total amount of silicon atom-attached hydrogen atoms in component (B) to the total amount of lower alkenyl groups in component (A) may range from 0.1:1 to 1:1. Component (C) is contained in such an amount as to give 0.1 to 1,000 parts by weight of platinum metal per million parts by weight of components (A) and (B) combined.

This composition is described in more detail. The organopolysiloxane as component (A) is a base of the silicone rubber composition for producing silicone rubber. It cures through addition reaction with component (B) under the catalysis of component (C). The organopolysiloxane should have at least two lower alkenyl groups each attached to a silicon atom in a molecule. The lower alkenyl groups are exemplified by vinyl, allyl and propenyl groups. Such lower alkenyl groups may be attached to either a silicon atom at an end or a silicon atom midway of a molecular chain or both. From the standpoint of obtaining a cured product having a penetration of at least 10, the preferred organopolysiloxane has at least one lower alkenyl group attached to a silicon atom midway of a molecular chain (that is, as a substituent on a side chain of the siloxane chain). The molecular structure of this component may be a linear structure, linear structure containing branches, cyclic structure, or network structure, preferably a linear structure containing a few or no branches. The molecular weight of this component is not critical, and covers from liquid one having a low viscosity to a raw rubber-like one having a very high viscosity.

More specifically, the organopolysiloxane of component (A) preferably has the following general compositional formula:

$$R_a SiO_{(4-a)/2}$$

wherein R is an unsubstituted or substituted monovalent hydrocarbon group having 1 to 10, preferably 1 to 8 carbon atoms, 0.001 to 10 mol %, preferably 0.01 to 2 mol % of R is a lower alkenyl group having 2 to 6 carbon atoms, and letter a is a positive number of 1.0 to 2.4, preferably 1.8 to 2.2, more preferably 1.95 to 2.05.

Examples of the unsubstituted monovalent hydrocarbon group represented by R include an alkyl group such as methyl, ethyl, propyl, isopropyl, butyl, isobutyl, tert-butyl, hexyl, cyclohexyl, octyl, and decyl groups, an alkenyl group such as vinyl, allyl, propenyl, isopropenyl, butenyl, isobutenyl and hexenyl groups, an aryl group such as phenyl, tolyl, xylyl and naphthyl groups, and an aralkyl group such as benzyl, phenylethyl, phenylpropyl groups. The substituted monovalent hydrocarbon group is one in which any or all of the hydrogen atoms bonded to the carbon atoms of the unsubstituted monovalent hydrocarbon group described above are replaced by a substituent such as a halogen atom. Examples of the substituted monovalent hydrocarbon group include a halogen substituted alkyl group such as chloromethyl, bromoethyl and trifluoropropyl groups.

To form a cured product in the form of a rubbery elastomer, the organopolysiloxane should preferably have a viscosity of at least 100 centipoise (cp) at 25° C., more preferably 100 to 1,000,000 cp at 25° C., most preferably 500 to 300,000 cp at 25° C.

Examples of the organopolysiloxane (A) include methylvinylcyclopolysiloxane, cyclocopolymers of methylvinylsiloxane with dimethylsiloxane, dimethylpolysiloxane blocked with dimethylvinylsiloxy groups at both ends, dimethylsiloxane-methylvinylsiloxane copolymers blocked with dimethylvinylsiloxy groups at both ends, dimethylsiloxane-methylphenylsiloxane copolymers blocked with dimethylvinylsiloxy groups at both ends, dimethylsiloxane-diphenylsiloxane-methylvinylsiloxane copolymers blocked with dimethylvinylsiloxy groups at both ends, dimethylsiloxane-methylvinylsiloxane copolymers blocked with trimethylsiloxy groups at both ends, dimethylsiloxane-methylphenylsiloxane-methylvinylsiloxane copolymers blocked with trimethylsiloxy groups at both ends, methyl(3,3,3-trifluoropropyl)polysiloxane blocked with methylvinylsiloxy groups at both ends, dimethylsiloxane-methyl(3,3,3-trifluoropropyl)siloxane copolymers blocked with dimethylvinylsiloxy groups at both ends, dimethylpolysiloxane blocked with trivinylsilyl groups at both ends, dimethylpolysiloxane blocked with divinylmethylsilyl groups at both ends, and polysiloxanes consisting of $CH_2=CH(CH_3)_2SiO_{1/2}$ units, $(CH_3)_3SiO_{1/2}$ units and $SiO_{4/2}$ units. Two or more of these organopolysiloxanes may be used in combination. Among them, preferred are diorganosiloxane-organovinylsiloxane copolymers blocked with triorganosiloxy groups at both ends (wherein the organo group is a monovalent hydrocarbon group excluding an alkenyl group as exemplified above) such as dimethylsiloxane-methylvinylsiloxane copolymers blocked with trimethylsiloxy groups at both ends.

Component (B) is a crosslinking agent for component (A). Under the catalysis of component (C), silicon atom-attached hydrogen atoms in component (B) undergo addition reaction with lower alkenyl groups in component (A) for curing. Inclusion of at least two, preferably at least three silicon atom-attached hydrogen atoms (that is, SiH groups) in a molecule is essential for component (B) to serve as a crosslinking agent. The molecular structure of this component is not critical and may be any of a linear structure, linear structure containing branches, cyclic structure, and three-dimensional network structure or resinous material.

As component (B), an organohydrogensiloxane having the following general compositional formula:

$$R'_b H_c SiO_{(4-b-c)/2}$$

is preferably used.

In the formula, R' is an unsubstituted or substituted monovalent hydrocarbon group containing no aliphatic unsaturated bond and having 1 to 10, preferably 1 to 8 carbon atoms. Examples of R' are the same as exemplified in R shown in the general compositional formula of component (A) and include alkyl groups, aryl groups, aralkyl groups and halogen-substituted alkyl groups, although the alkenyl group is omitted. Among them, methyl group, phenyl group, and 3,3,3-trifluoropropyl group are preferred as R'. Letters b and c are positive numbers satisfying the following relationship: $0.7 \leq b \leq 2.2$, preferably $1 \leq b \leq 2$, $0.001 \leq c \leq 1.2$, preferably $0.01 \leq c \leq 1$, and $0.8 \leq b+c \leq 2.7$, preferably $1 \leq b+c \leq 2.4$, more preferably $1.8 \leq b+c \leq 2.2$.

The molecular weight of component (B) is not critical although it should preferably have a viscosity of 0.1 to 50,000 cp at 25° C., more preferably 0.5 to 1,000 cp at 25° C., for compatibility with component (A). The number of silicon atoms is preferably 200 or less, more preferably 4 to 150, especially 4 to 50.

Component (B) is contained in such an amount that the molar ratio of the total amount of silicon atom-attached hydrogen atoms in component (B) to the total amount of lower alkenyl groups in component (A) may range from 0.1:1 to 1:1, preferably from 0.4:1 to 0.9:1, and more preferably from 0.6:1 to 0.8:1. A molar ratio of less than 0.1/1 results in a too low crosslinking density and undercure. A molar ratio of more than 1/1 results in a too high crosslinking density to produce a cured product with a penetration of 10 to 200 and can adversely affect the fluoroplastic layer. Where another organosiloxane containing many alkenyl groups is separately added for reinforcement or other purposes, it is recommended to add an additional amount of component (B) so as to give a number of silicon atom-attached hydrogen atoms (SiH groups) corresponding to the additional alkenyl groups.

Illustrative examples of component (B) include methylhydrogencyclopolysiloxane, cyclic copolymers of methylhydrogensiloxane with dimethylsiloxane, methylhydrogenpolysiloxane blocked with trimethylsiloxy groups at both ends, dimethylsiloxane-methylhydrogensiloxane copolymers blocked with trimethylsiloxy groups at both ends, dimethylsiloxane-methylhydrogensiloxane copolymers blocked with dimethylhydrogensiloxy groups at both ends, diphenylsiloxane-dimethylsiloxane-methylhydrogensiloxane copolymers blocked with dimethylhydrogensiloxy groups at both ends, copolymers consisting of $(CH_3)_2HSiO_{1/2}$ units and $SiO_{4/2}$ units, and copolymers consisting of $(CH_3)_3SiO_{1/2}$ units, $(CH_3)_2HSiO_{1/2}$ units, and $SiO_{4/2}$ units.

From the viewpoint of preparing a silicone rubber having a penetration of at least 10 according to ASTM D1403 (¼ cone), diorganosiloxane-organohydrogensiloxane copolymers blocked with diorganohydrogensiloxy groups at both ends (wherein the organo group is a monovalent hydrocarbon group excluding an alkenyl group) as shown in the following formula (1), especially dimethylsiloxane-methylhydrogensiloxane copolymers blocked with dimethylhydrogensiloxy groups at both ends are preferred.

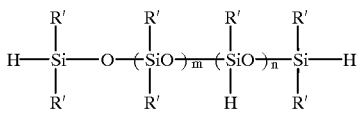
(1)

wherein R' is defined above, and each m and n is an integer of 1 or more, preferably 1 to 100, more preferably 1 to 50.

Component (C) is a catalyst for promoting addition reaction between silicon atom-attached hydrogen atoms (SiH groups) and alkenyl groups. Exemplary catalysts include chloroplatinic acid, solutions of chloroplatinic acid in alcohols and ketones, ripened such solutions, complexes of chloroplatinic acid with olefins, complexes of chloroplatinic acid with alkenylsiloxanes, complexes of chloroplatinic acid with diketones, platinum black, and platinum on carriers. Component (C) is contained in such an amount as to give 0.1 to 1,000 parts by weight of platinum metal per million parts by weight of components (A) and (B) combined. With less than 0.1 ppm of the catalyst, crosslinking reaction would not fully proceed. More than 1,000 ppm of the catalyst is uneconomical. On ordinary use, the catalyst is used in an amount of about 1 to 100 ppm of platinum metal.

In the liquid silicone rubber composition used herein, fillers may be blended for adjusting the fluidity of the composition or increasing the mechanical strength of molded products. Useful fillers include reinforcing fillers such as precipitated silica, fumed silica, fired silica, and fumed titanium oxide, and non-reinforcing fillers such as ground quartz, diatomaceous earth, asbestos, aluminosilicate, iron oxide, zinc oxide, and calcium carbonate. They may be used as such or surface treated with organic silicon compounds such as hexamethylsilazane, trimethylchlorosilane, and polymethylsiloxane. Also, a minor or trace amount of additives for restraining curing reaction, such as acetylene compounds, hydrazines and triazoles may be added to the organopolysiloxane composition used herein insofar as the objects of the invention are not impaired. Besides, pigments, heat-resistance modifiers, flame retardants, plasticizers, and organopolysiloxanes having one alkenyl group in a molecule for reducing modulus may also be blended if desired.

Although its thickness is not necessarily limited, the silicone rubber layer formed from the above-described addition reaction type silicone rubber composition to a penetration of at least 10 preferably has a thickness of 0.1 to 50 mm, especially 1 to 30 mm. If the rubber layer is thinner than 0.1 mm, the overall fluoroplastic covered roll would have a high hardness, failing to provide a nip width and producing defective images after fixation. If the rubber layer is thicker than 50 mm, the overall fluoroplastic covered roll would have a low hardness and undesirably allow paper sheets to slip thereon.

The heat fixing roll of the invention further includes a fluoroplastic layer covering the silicone rubber layer having a penetration of at least 10.

The fluoroplastic layer (that is, thermoplastic resin layer consisting essentially of fluorocarbons) may be formed by applying fluoroplastic latex coating compositions such as polytetrafluoroethylene (PTFE) or fitting fluorocarbon resin tubes, typically, tetrafluoroethylene-perfluoroalkylvinylether (PFA) tubes. When tetrafluoroethylene-perfluoroalkylvinylether (PFA) tubes are used, the inner surface of the tube which will come in contact with the silicone rubber layer is preferably pretreated by a corona discharge, sodium naphthalene, sputtering etching or liquid ammonia method so that the tube is bondable to the silicone rubber.

An appropriate thickness may be selected for the fluoroplastic layer although a thickness of about 1 to 100 μm, especially about 5 to 50 μm is preferable. If the thickness of the fluoroplastic layer is less than 1 μm, the overall fluoroplastic covered roll would have a low hardness and undesirably allow paper sheets to slip thereon. If the thickness is more than 100 μm, the overall fluoroplastic covered roll would have a high hardness, failing to provide a nip width and producing defective images after fixation.

The heat fixing roll of the invention can be prepared, for example, by the following methods. In a first method, a metal mandrel on the outer surface is pretreated with a primer. An addition reaction type liquid silicone rubber composition is molded and cured to the outer surface of the metal mandrel as by press molding or liquid injection molding, forming a silicone rubber layer having a penetration of at least 10. Then, a fluoroplastic latex coating composition such as a polytetrafluoroethylene (PTFE) latex coating solution is spray coated onto the silicone rubber layer and baked at high temperature, forming a fluoroplastic layer.

In a second method, a metal mandrel on the outer surface is pretreated with a primer, and a tetrafluoro-ethylene-perfluoroalkylvinylether (PFA) tube on the inner surface is pretreated with a primer. The mandrel is inserted into the tube. An uncured silicone rubber composition is cast into the space between the tube and the mandrel and heat cured in situ, forming the roll.

EXAMPLE

Blend examples, inventive examples, and comparative examples are given below for further illustrating the invention. The invention is not limited to the following Examples. All parts are by weight.

Preparation Example 1

A liquid composition 1 was prepared by mixing 100 parts of a dimethylsiloxane-methylvinylsiloxane copolymer blocked with trimethylsiloxy groups at both ends having about five vinyl groups on an average at side chains as the methylvinylsiloxane unit and having a viscosity of 10,000 cp at 25° C. (a degree of polymerization is about 700; vinyl value is 0.0094 mol/100 g), 35 parts of crystalline silica having a mean particle size of 5 μm, 2.8 parts of methylhydrogenpolysiloxane having SiH groups at side chains and both ends (the amount of SiH group: 0.00308 mol/g) represented by the following formula (A):

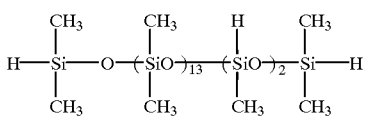

(A)

0.2 part of a platinum catalyst (Pt concentration 1% by weight), and 0.1 part of 1-ethynyl-1-cyclohexanol as a reaction controller. It is noted that the molar ratio of silicon atom-attached hydrogen atoms (SiH groups) in the methylhydrogenpolysiloxane to vinyl groups in the dimethylsiloxane-methylvinylsiloxane copolymer is 0.9/1. This liquid composition 1 was heat cured at 150° C. for 30 minutes and post cured at 200° C. for 4 hours. The cured product was measured for penetration according to ASTM D1403 (¼ cone), finding a penetration value of 10.

Preparation Example 2

A liquid composition 2 was prepared by mixing 100 parts of a dimethylsiloxane-methylvinylsiloxane copolymer blocked with trimethylsiloxy groups at both ends having about five vinyl groups on an average at side chains as the methylvinylsiloxane unit and having a viscosity of 10,000 cp at 25° C. (a degree of polymerization is about 700; vinyl value is 0.0094 mol/100 g), 10 parts of crystalline silica having a mean particle size of 5 µm, 2.0 parts of methylhydrogenpolysiloxane of the above formula (A), 0.2 part of a platinum catalyst (Pt concentration 1% by weight), and 0.1 part of 1-ethynyl-1-cyclohexanol as a reaction controller. It is noted that the molar ratio of SiH groups in the methylhydrogenpolysiloxane to vinyl groups in the dimethylsiloxane-methylvinylsiloxane copolymer is 0.7/1. This liquid composition 2 was heat cured at 150° C. for 30 minutes and post cured at 200° C. for 4 hours. The cured product was measured for penetration according to ASTM D1403 (¼ cone), finding a penetration value of 20.

Preparation Example 3

A liquid composition 3 was prepared by mixing 100 parts of a dimethylpolysiloxane containing vinyldimethylsilyl groups at both ends (viscosity 10,000 cp), 50 parts of crystalline silica having a mean particle size of 5 µm, 3.6 parts of methylhydrogenpolysiloxane of the above formula (A), 0.2 part of a platinum catalyst (Pt concentration 1% by weight), and 0.1 part of 1-ethynyl-1-cyclohexanol as a reaction controller. It is noted that the molar ratio of SiH groups in the methylhydrogenpolysiloxane to vinyl groups in the dimethylpolysiloxane is 1.2/1. This liquid composition 3 was heat cured at 150° C. for 30 minutes and post cured at 200° C. for 4 hours. The cured product was measured for penetration according to ASTM D1403 (¼ cone), finding a penetration value of 8.

Example 1

A primer No. 101A/B for addition reaction type liquid silicone rubber (by Shin-Etsu Chemical Co., Ltd.) was applied to an aluminum shaft having a diameter of 24 mm and a length of 300 mm. The shaft was inserted into a fluoroplastic PFA tube with a gage of 50 µm which had been treated on its inner surface with the primer. Liquid composition 1 of Blend Example 1 was introduced between the tube and the shaft, heat cured at 150° C. for 30 minutes and post cured at 200° C. for 4 hours. There was formed a PFA resin-covered low hardness silicone rubber roll having an outer diameter of 34 mm and a length of 250 mm.

Separately, a polytetrafluoroethylene latex was coated onto the surface of an aluminum shaft having a diameter of 50 mm and a length of 300 mm and baked at 300° C. for 15 minutes. This roll was placed in contact with the PFA resin-covered silicone rubber roll. With a load of 2 kg applied, a nip width of 20 mm was measured.

The PFA resin-covered silicone rubber roll was incorporated in a PPC copier as the fixing roll whereupon duplication was carried out 100,000 sheets, obtaining satisfactory copies. Example 2

A primer No. 101A/B for addition reaction type liquid silicone rubber (by Shin-Etsu Chemical Co., Ltd.) was applied to an aluminum shaft having a diameter of 24 mm and a length of 300 mm. The shaft was inserted into a fluoroplastic PFA tube with a gage of 50 µm which had been treated on its inner surface with the primer. Liquid composition 2 of Blend Example 2 was introduced between the tube and the shaft, heat cured at 150° C. for 30 minutes and post cured at 200° C. for 4 hours. There was formed a PFA resin-covered low hardness silicone rubber roll having an outer diameter of 34 mm and a length of 250 mm.

Separately, a polytetrafluoroethylene latex was coated onto the surface of an aluminum shaft having a diameter of 50 mm and a length of 300 mm and baked at 300° C. for 15 minutes. This roll was placed in contact with the PFA resin-covered silicone rubber roll. With a load of 2 kg applied, a nip width of 25 mm was measured.

The PFA resin-covered silicone rubber roll was incorporated in a PPC copier as the fixing roll whereupon duplication was carried out 100,000 sheets, obtaining satisfactory copies.

Comparative Example 1

A primer No. 101A/B for addition reaction type liquid silicone rubber (by Shin-Etsu Chemical Co., Ltd.) was applied to an aluminum shaft having a diameter of 24 mm and a length of 300 mm. The shaft was inserted into a fluoroplastic PFA tube with a gage of 50 µm which had been treated on its inner surface with the primer. Liquid composition 3 of Blend Example 3 was introduced between the tube and the shaft, heat cured at 150° C. for 30 minutes and post cured at 200° C. for 4 hours. There was formed a PFA resin-covered low hardness silicone rubber roll having an outer diameter of 34 mm and a length of 250 mm.

As in Example 1, a polytetrafluoroethylene latex was coated onto the surface of an aluminum shaft having a diameter of 50 mm and a length of 300 mm and baked at 300° C. for 15 minutes. This roll was placed in contact with the PFA resin-covered silicone rubber roll. With a load of 2 kg applied, a nip width of 5 mm was measured.

The PFA resin-covered silicone rubber roll was incorporated in a PPC copier as the fixing roll whereupon duplication was carried out 5,000 sheets, obtaining copies with fixation variations.

Comparative Example 2

A primer No. 101A/B for addition reaction type liquid silicone rubber (by Shin-Etsu Chemical Co., Ltd.) was applied to an aluminum shaft having a diameter of 24 mm and a length of 300 mm. The shaft was placed in a mold defining a roll-shaped cavity, which was filled with Liquid composition 1 of Blend Example 1. The composition was heat cured at 150° C. for 30 minutes and post cured at 200° C. for 4 hours, obtaining a low hardness silicone rubber roll having an outer diameter of 34 mm and a length of 250 mm.

The silicone rubber roll was incorporated in a PPC copier as the fixing roll whereupon duplication was carried out 10,000 sheets, obtaining copies with fixation variations.

There has been described a heat fixing roll having a low hardness silicone rubber layer and a fluoroplastic cover, which insures a sufficient nip width under low pressure, has improved abrasion resistance and long-lasting toner release, and maintains a satisfactory fixing function even at a high speed over a long period of time. The heat fixing roll is thus useful as transfer rolls, heating rolls and pressure rolls in PPC, LBP, and facsimile machines.

Japanese Patent Application No. 151610/1997 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

We claim:

1. A heat fixing roll comprising
   a cylindrical metal mandrel having an outer surface,
   a concentric silicone rubber layer having an outer surface obtained by curing an addition reaction type liquid silicone rubber composition to the outer surface of the mandrel, and
   a fluoroplastic layer on the outer surface of the silicone rubber layer,
   said addition reaction type liquid silicone rubber composition comprising
   (A) a linear organopolysiloxane having at least two lower alkenyl groups in a molecule and having the following compositional formula:

   $$R_aSiO_{(4-a)/2}$$

wherein R is an unsubstituted or substituted monovalent hydrocarbon group having 1 to 10 carbon atoms, 0.001 to 10 mol % of R is a lower alkenyl group having 2 to 6 carbon atoms, and letter a is a positive number of 1.95 to 2.05,
   (B) an organopolysiloxane having at least two hydrogen atoms each attached to a silicon atom in a molecule and having the following compositional formula:

   $$R'_bH_cSiO_{(4-b-c)/2}$$

wherein R' is an unsubstituted or substituted monovalent hydrocarbon group containing no aliphatic unsaturated bond and having 1 to 10 carbon atoms, and letters b and c are positive numbers satisfying the following relationship: $0.7 \leq b \leq 2.2$, $0.001 \leq c \leq 1.2$ and $0.8 \leq b+c \leq 2.7$, in such an amount that the molar ratio of the total amount of silicon atom-attached hydrogen atoms in component (B) to the total amount of lower alkenyl groups in component (A) ranges from 0.1:1 to 1:1, and
   (C) a platinum catalyst in such an amount as to give 0.1 to 1,000 parts by weight of platinum metal per million parts by weight of components (A) and (B) combined, and
   said silicone rubber having a penetration of at least 10 according to ASTM D1403.

2. The heat fixing roll according to claim 1, wherein the addition reaction type liquid silicone rubber composition further comprises at least one of inorganic fillers, pigments, or heat resistance modifiers.

3. The heat fixing roll according to claim 1, wherein said silicone rubber has a penetration of 10 to 200.

4. The heat fixing roll according to claim 1, wherein the silicone rubber has a penetration of 15 to 100.

5. The heat fixing roll according to claim 1, wherein said at least two lower alkenyl groups are selected from the group consisting of vinyl, allyl, and propenyl groups.

6. The heat fixing roll according to claim 1, wherein R is an unsubstituted or substituted monovalent hydrocarbon group having 1 to 8 carbon atoms.

7. The heat fixing roll according to claim 1, wherein 0.01 to 2 mol % of R is a lower alkenyl groups having 2 to 6 carbon atoms.

8. The heat fixing roll according to claim 1, wherein letter a is 1.95 to 2.05.

9. The heat fixing roll according to claim 1, wherein R is
   an alkyl selected from the group consisting of methyl, ethyl, propyl, isopropyl, butyl, isobutyl, tert-butyl, hexyl, cyclohexyl, octyl, and decyl;
   an alkenyl group selected from the group consisting of vinyl, allyl, propenyl, isopropenyl, butenyl, isobutenyl and hexenyl;
   an aryl group selected from the group consisting of phenyl, tolyl, xylyl and naphthyl; or
   an aralkyl group selected from the group consisting of benzyl, phenylethyl, and phenylpropyl.

10. The heat fixing roll according to claim 1, wherein the linear organopolysiloxane (A) has a viscosity of at least 100 centipoise at 25° C.

11. The heat fixing roll according to claim 1, wherein the linear organopolysiloxane (A) is selected from the group consisting of methylvinylcyclopolysiloxane, cyclocopolymers of methylvinylsiloxane with dimethylsiloxane, dimethylpolysiloxane blocked with dimethylvinylsiloxy groups at both ends, dimethylsiloxane-methylvinylsiloxane copolymers blocked with dimethylvinylsiloxy groups at both ends, dimethylsiloxane-methylphenylsiloxane copolymers blocked with dimethylvinylsiloxy groups at both ends, dimethylsiloxane-diphenylsiloxane-methylvinylsiloxane copolymers blocked with dimethylvinylsiloxy groups at both ends, dimethylsiloxane-methylvinylsiloxane copolymers blocked with trimethylsiloxy groups at both ends, dimethylsiloxane-methylphenylsiloxane-methylvinylsiloxane copolymers blocked with trimethylsiloxy groups at both ends, methyl(3,3,3-trifluoropropyl) polysiloxane blocked with methylvinylsiloxy groups at both ends, dimethylsiloxane-methyl(3,3,3-trifluoropropyl) siloxane copolymers blocked with dimethylvinylsiloxy groups at both ends, dimethylpolysiloxane blocked with trivinylsilyl groups at both ends, dimethylpolysiloxane blocked with divinylmethylsilyl groups at both ends, polysiloxanes consisting of $CH_2=CH(CH_3)_2SiO_{1/2}$ units, $(CH_3)_3SiO_{1/2}$ units and $SiO_{4/2}$ units and mixtures thereof.

12. The heat fixing roll according to claim 1, wherein the organopolysiloxane (B) has at least 3 hydrogen atoms each attached to a silicon atom in a molecule.

13. The heat fixing roll according to claim 1, wherein the organopolysiloxane (B) is selected from the group consisting of methylhydrogencyclopolysiloxane, cyclic copolymers of methylhydrogensiloxane with dimethylsiloxane, methylhydrogenpolysiloxane blocked with trimethylsiloxy groups at both ends, dimethylsiloxane-methylhydrogensiloxane copolymers blocked with trimethylsiloxy groups at both ends, dimethylsiloxane-methylhydrogensiloxane copolymers blocked with dimethylhydrogensiloxy groups at both ends, diphenylsiloxane-dimethylsiloxanemethylhydrogensiloxane copolymers blocked with dimethylhydrogensiloxy groups at both ends, copolymers consisting of $(CH_3)_2HSiO_{1/2}$ units and $SiO_{4/2}$ units, and copolymers consisting of $(CH_3)_3SiO_{1/2}$ units, $(CH_3)_2 HSiO_{1/2}$ units, and $SiO_{4/2}$ unit.

14. The heat fixing roll according to claim 1, wherein component (C) is a catalyst selected from the group consisting of chloroplatinic acid, solutions of chloroplatinic acid in alcohols and ketones, ripened solutions of chloroplatinic acid in alcohols and ketones, complexes of chloroplatinic acid with olefins, complexes of chloroplatinic acid with alkenylsiloxanes, complexes of chloroplatinic acid with diketones, platinum black, and platinum on carriers.

15. The heat fixing roll according to claim 1, wherein the fluoroplastic layer is a thermoplastic resin consisting essentially of fluorocarbons.

16. The heat fixing roll according to claim 1, wherein the fluoroplastic layer has a thickness of 1 to 100 µm.

* * * * *